(12) United States Patent
Yang et al.

(10) Patent No.: US 11,467,050 B2
(45) Date of Patent: Oct. 11, 2022

(54) ORIENTATION DEVICE, ORIENTATION METHOD AND ORIENTATION SYSTEM INCLUDING A SEAT BODY, A PRESSURE SENSOR AND A COMPUTING UNIT

(71) Applicants: Yao-Hsien Yang, Taipei (TW); Jyh-Chyang Tzou, Taipei (TW); Hsin Yeh, Taipei (TW)

(72) Inventors: Yao-Hsien Yang, Taipei (TW); Jyh-Chyang Tzou, Taipei (TW); Hsin Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 904 days.

(21) Appl. No.: 16/281,104

(22) Filed: Feb. 21, 2019

(65) Prior Publication Data
US 2019/0360885 A1 Nov. 28, 2019

(30) Foreign Application Priority Data

May 22, 2018 (TW) .................................. 107117428

(51) Int. Cl.
*G01L 19/00* (2006.01)
*G01L 19/14* (2006.01)
*G06V 10/75* (2022.01)

(52) U.S. Cl.
CPC .......... *G01L 19/0092* (2013.01); *G01L 19/14* (2013.01); *G06V 10/754* (2022.01); *G01L 2019/0053* (2013.01); *G06V 10/759* (2022.01)

(58) Field of Classification Search
None
See application file for complete search history.

(56) References Cited

U.S. PATENT DOCUMENTS

| | | | |
|---|---|---|---|
| 2013/0158895 A1* | 6/2013 | Bessho | B60N 2/002 702/41 |
| 2019/0193591 A1* | 6/2019 | Migneco | B60N 2/0244 |
| 2020/0098185 A1* | 3/2020 | Schradin | G06T 19/006 |

FOREIGN PATENT DOCUMENTS

| | | | | |
|---|---|---|---|---|
| CN | 205457381 | | 8/2016 | |
| CN | 108024636 B | * | 9/2021 | ............. A47B 21/06 |
| DE | 102015213442 B4 | * | 7/2019 | ........... B60N 2/0248 |
| TW | 201023773 | | 7/2010 | |
| TW | 201334771 | | 9/2013 | |

OTHER PUBLICATIONS

"Office Action of Taiwan Counterpart Application", dated May 27, 2019, p. 1-p. 12.

* cited by examiner

*Primary Examiner* — Peter J Macchiarolo
*Assistant Examiner* — Jermaine L Jenkins
(74) *Attorney, Agent, or Firm* — JCIPRNET

(57) ABSTRACT

An orientation device, an orientation system and an orientation method are provided. The orientation device includes a seat body, a pressure sensor, and a computing unit. The seat body includes a bearing surface, and the seat body is non-directional. The pressure sensor is disposed below the bearing surface. The pressure sensor is configured to obtain a plurality of pressure data of the bearing surface when an object is disposed on the bearing surface. The computing unit is coupled to the pressure sensor. The computing unit is configured to analyze the pressure data to obtain a direction data. The direction data is configured to determine a first direction of the seat body.

23 Claims, 7 Drawing Sheets

US 11,467,050 B2

ORIENTATION DEVICE, ORIENTATION METHOD AND ORIENTATION SYSTEM INCLUDING A SEAT BODY, A PRESSURE SENSOR AND A COMPUTING UNIT

CROSS-REFERENCE TO RELATED APPLICATION

This application claims the priority benefit of Taiwan application serial no. 107117428, filed on May 22, 2018. The entirety of the above-mentioned patent application is hereby incorporated by reference herein and made a part of this specification.

BACKGROUND

Technical Field

The invention relates to an orientation technology. More particularly, the invention relates to an orientation device, an orientation method, and an orientation system.

Description of Related Art

In general virtual reality applications, a user wears a head-mounted display to watch virtual reality images. Moreover, the user can input control commands through a simple button or a remote controller so that the user can interact with the application in the virtual world. Nevertheless, as applications of virtual reality gradually diversify, the head-mounted display alone can no longer satisfy user's needs to interact with the virtual world. In this regard, how other types of hardware equipment can be applied so as to enhance the interactive function between the user and the virtual world is an important development direction in the current virtual reality applications. Therefore, several exemplary embodiments are provided as follows.

SUMMARY

The invention provides an orientation device, an orientation method, and an orientation system to allow a user to control with a sitting posture through a non-directional seat and automatically determine a direction the user is facing when the user sits on a seat body, so as to effectively define a front direction of the seat body.

In an embodiment of the invention, an orientation device includes a seat body, a pressure sensor, and a computing unit. The seat body includes a bearing surface, and the seat body is non-directional. The pressure sensor is disposed below the bearing surface. The pressure sensor is configured to obtain a plurality of pressure data of the bearing surface when an object is disposed on the bearing surface. The computing unit is coupled to the pressure sensor. The computing unit is configured to analyze the pressure data to obtain a direction data. The direction data is configured to determine a first direction of the seat body.

In an embodiment of the invention, an orientation method is suited for an orientation device. The orientation method includes the following steps. A plurality of pressure data of a bearing surface is obtained through a pressure sensor when an object is disposed on the bearing surface of a seat body of the orientation device. The pressure data is analyzed through a computing unit to obtain a direction data, wherein the direction data is configured to determine a first direction of the seat body.

In an embodiment of the invention, an orientation system includes an orientation device and computer device. The orientation device includes a seat body, a pressure sensor, and a computing unit. The seat body has a bearing surface, and the seat body is non-directional. The pressure sensor is disposed below the bearing surface. The pressure sensor is configured to obtain a plurality of pressure data of the bearing surface when an object is disposed on the bearing surface. The computing unit is coupled to the pressure sensor. The computing unit is configured to analyze the pressure data to obtain a direction data. The direction data is configured to determine a first direction of the seat body. The computer device is coupled to the orientation device. The computer device is configured to receive the direction data to correspondingly execute an application according to the direction data.

To sum up, the orientation device, the orientation method, and the orientation system provided by the embodiments of the invention may sense the pressure data generated when the user sits on the seat body through the pressure sensor, and obtain the direction the user is facing when the user sits on the seat body through analyzing the pressure data to obtain the direction data. Further, the orientation device provided by the embodiments of the invention may further provide the direction data to the computer device. In this way, when executing a specific application, the computer device may provide the corresponding interactive function according to the direction data.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
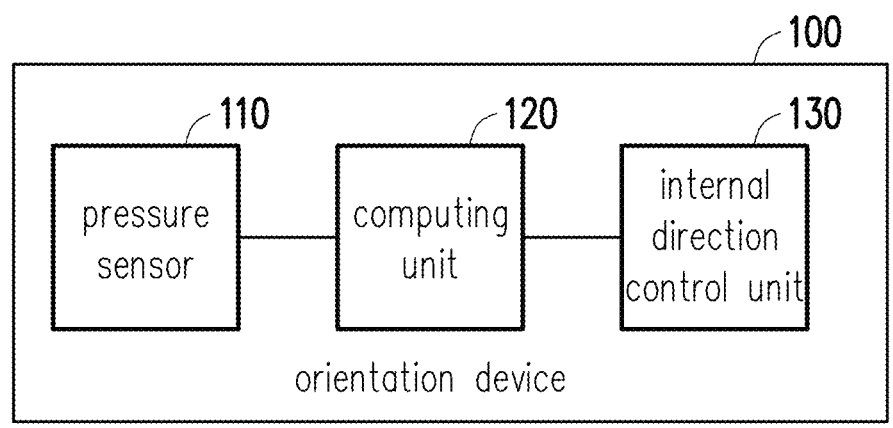
FIG. 1 is a block view of an orientation device according to an embodiment of the invention.

In order to make the invention more comprehensible, several embodiments are described below as examples of implementation of the invention. Moreover, elements/components/steps with the same reference numerals are used to represent the same or similar parts in the drawings and embodiments.

FIG. 1 is a block view of an orientation device according to an embodiment of the invention. With reference to FIG. 1, an orientation device 100 includes a pressure sensor 110, a computing unit 120, and an internal direction control unit 130. The computing unit 120 is coupled to the pressure sensor 110 and the internal direction control unit 130. In this embodiment, the orientation device 100 is, for example, a non-directional seat, and the pressure sensor 110 is configured to sense a plurality of pressure data generated when a user sits on the orientation device 100. The pressure sensor 110 provides the pressure data to the computing unit 120, so as to analyze the pressure data through the computing unit 120 to obtain a direction data. Further, the computing unit 120 provides a direction control signal when the pressure data changes over time. In this embodiment, the direction data may be a front direction data.

In this embodiment, the direction data is configured to determine a first direction of the orientation device 100. The computing unit 120 provides the direction data to the internal direction control unit 130. The internal direction control unit 130 further determines a second direction, a third direction, and a fourth direction of the orientation device 100 according to the direction data to output a direction control definition data. In this embodiment, the first direction may be a front direction. The second direction may be a back direction. The third direction may be a left direction. The fourth direction may be a right direction. That is, when the user sits on a non-directional seat body of the orientation device 100, the orientation device 100 automatically determines a direction the user is facing and effectively defines the front direction of the seat body.

In this embodiment, the computing unit 120 and the internal direction control unit 130 are, for example, functional circuit elements disposed in a processor, wherein the processor is, for example, a central processing unit (CPU), a system on chip (SOC) or a programmable microprocessor for general or special use, a digital signal processor (DSP), a programmable controller, an application specific integrated circuit (ASIC), a programmable logic device (PLD), other similar processing device, or a combination of the foregoing devices. Nevertheless, the invention is not limited thereto. In an embodiment, the computing unit 120 and the internal direction control unit 130 may also be functional circuits, processors, or controllers which are separately disposed.

Figure 2A:
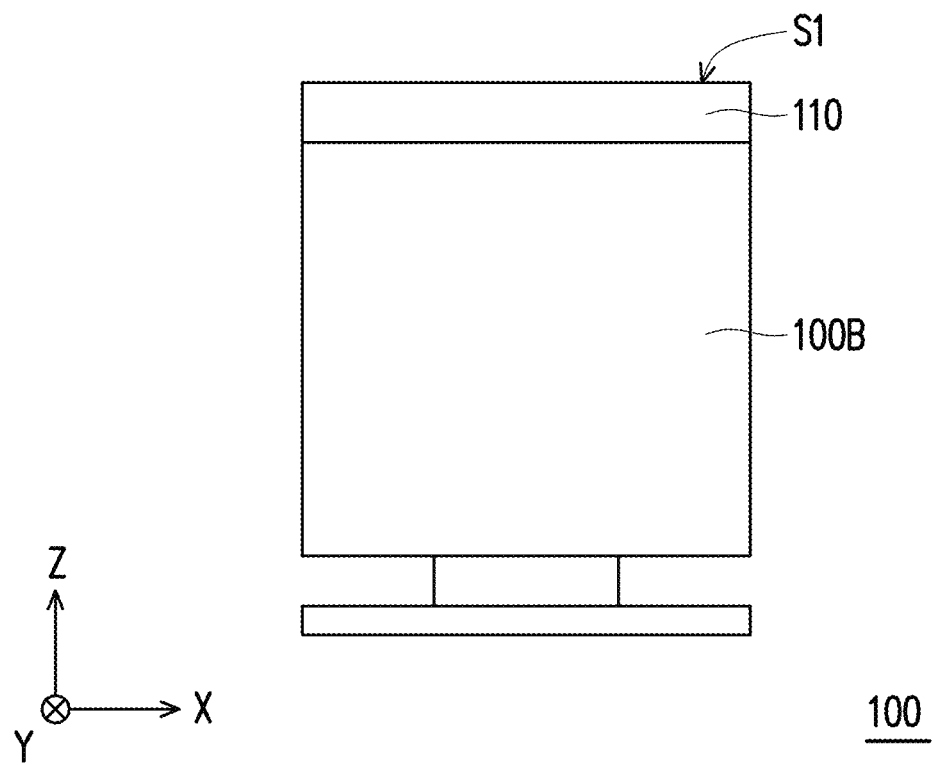
FIG. 2A is a side view of the orientation device according to an embodiment of the invention.

FIG. 2A is a side view of the orientation device according to an embodiment of the invention. The followings refer to FIG. 1 and FIG. 2A. In this embodiment, a device body 100B of the orientation device 100 is, for example, a non-directional seat. The pressure sensor 110 is disposed above the device body 100B, and the pressure sensor 110 has a bearing surface S1. In this embodiment, the bearing surface S1 is parallel to a horizontal plane extending from an X axis and a Y axis. When the user sits on the orientation device 100, buttocks of the user are in contact with the bearing surface S1. In other words, the bearing surface S1 bears a weight of the user in a Z axis direction, and a pressure distribution on the bearing surface S1 is determined according to a sitting direction of the user. In addition, in this embodiment, the orientation device 100 further provides a direction control function when the user changes his/her sitting posture when sitting on the device body 100B. For instance, the user may lean forwards, lean backwards, lean leftwards, or lean rightwards to allow the pressure sensor 110 to receive different pressure distribution changes and thus correspondingly output the direction control signal.

Figure 2B:
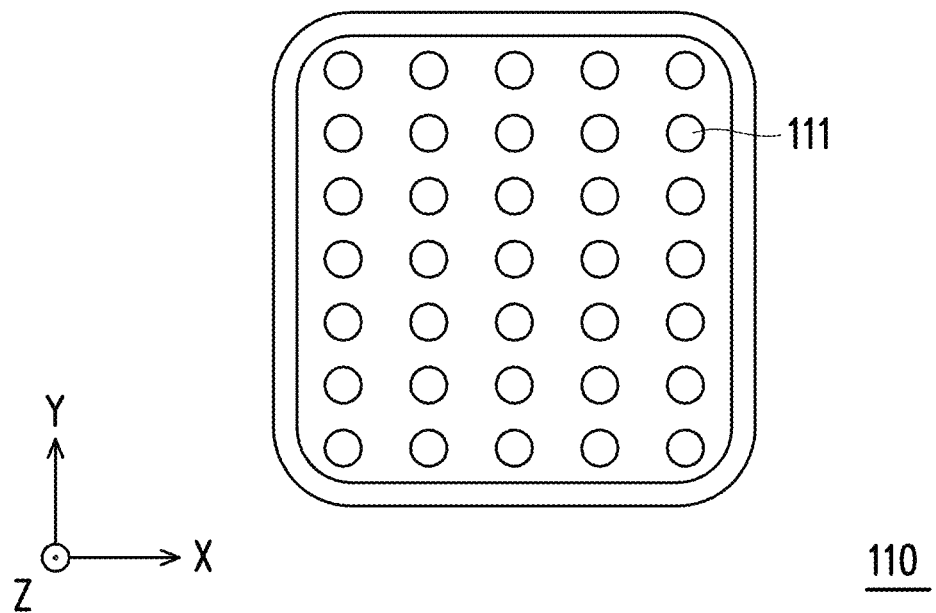
FIG. 2B is a top view of a pressure sensor according to an embodiment of the invention.
Figure 2C:
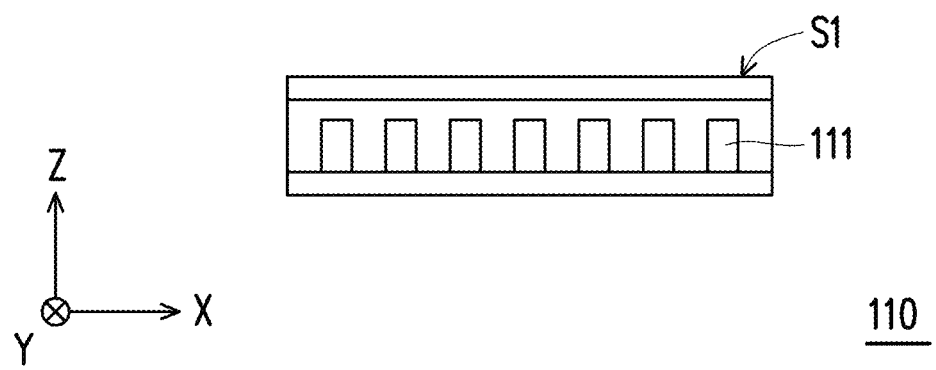
FIG. 2C is a side view of the pressure sensor according to an embodiment of the invention.

FIG. 2B is a top view of a pressure sensor according to an embodiment of the invention. FIG. 2C is a side view of the pressure sensor according to an embodiment of the invention. With reference to FIG. 2B and FIG. 2C, the pressure sensor 110 of this embodiment includes, for example, a plurality of pressure sensing elements 111 arranged in an array. The pressure sensing elements 111 are disposed below the bearing surface S1 to sense a pressure (e.g., the weight of the user) borne in the Z axis direction. In this embodiment, the pressure sensing elements 111 are, for example, piezoresistive pressure sensing elements, capacitive pressure sensing elements, piezoelectric pressuring sensing elements, or other similar pressure sensing elements, which are not limited by the invention.

Figure 3:
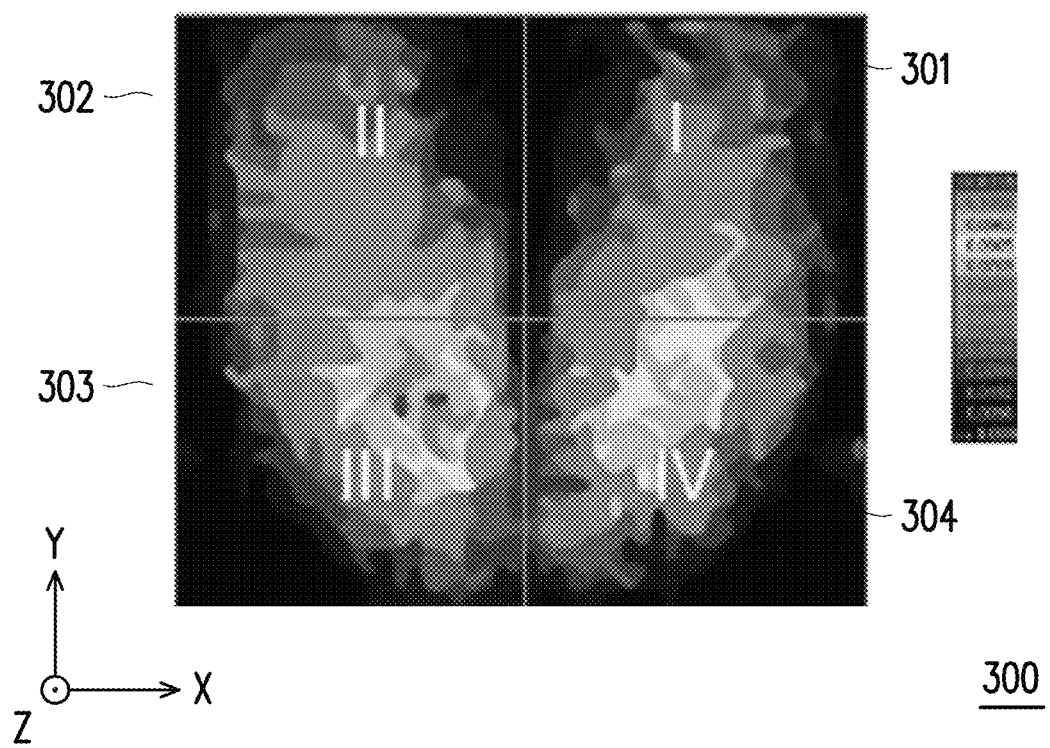
FIG. 3 is a schematic image of pressure pattern comparison according to an embodiment of the invention.

FIG. 3 is a schematic image of a pressure pattern according to an embodiment of the invention. With reference to FIG. 1 to FIG. 3, when the user sits on the orientation device 100, the pressure sensing elements 111 of the pressure sensor 110 sense the pressure data, and the computing unit 120 integrates the pressure data to obtain a pressure distribution 300 as shown in FIG. 3. In this embodiment, the pressure distribution 300 may be divided into four pressure distribution blocks 301 to 304 according to a first quadrant to a fourth quadrant. As shown in FIG. 3, a color of a portion is lighter when the portion has a greater pressure value (or a greater distribution density), and a color of a portion is darker when the portion has a lower pressure value (or a lower distribution density). In this embodiment, the computing unit 120 respectively calculates four pressure average values of the four pressure distribution blocks 301 to 304 in the four quadrants of the pressure distribution 300 and compares the four pressure average values.

The computing unit 120 determines a direction corresponding to the highest two values among the four pressure average values is the back, and a direction opposite to this direction is the front. In this embodiment, a 90-degree counter-clockwise rotation direction of this direction may be further determined to be the left direction, and a 90-degree clockwise rotation direction of this direction may be further determined to be the right direction by the computing unit.

For instance, as shown in FIG. 3, since the pressure average values of a pressure distribution 303 of a third quadrant and a pressure distribution 304 of a fourth quadrant are respectively greater than that of a first quadrant and a second quadrant, the computing unit 120 defines a negative Y axis direction as the back and a positive Y axis direction as the front. The computing unit 120 outputs the front direction data to the internal direction control unit 130, so as to allow the internal direction control unit 130 to further define the back direction, the left direction, and the right direction of the seat body 100B to output the direction control definition data.

Figure 4:
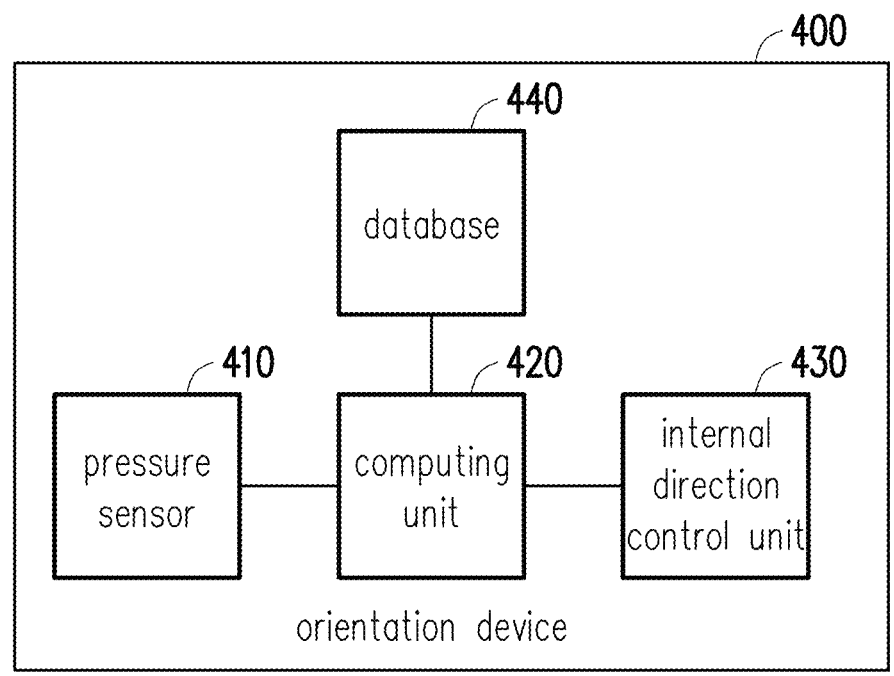
FIG. 4 is a block view of an orientation device according to another embodiment of the invention.
Figure 5:
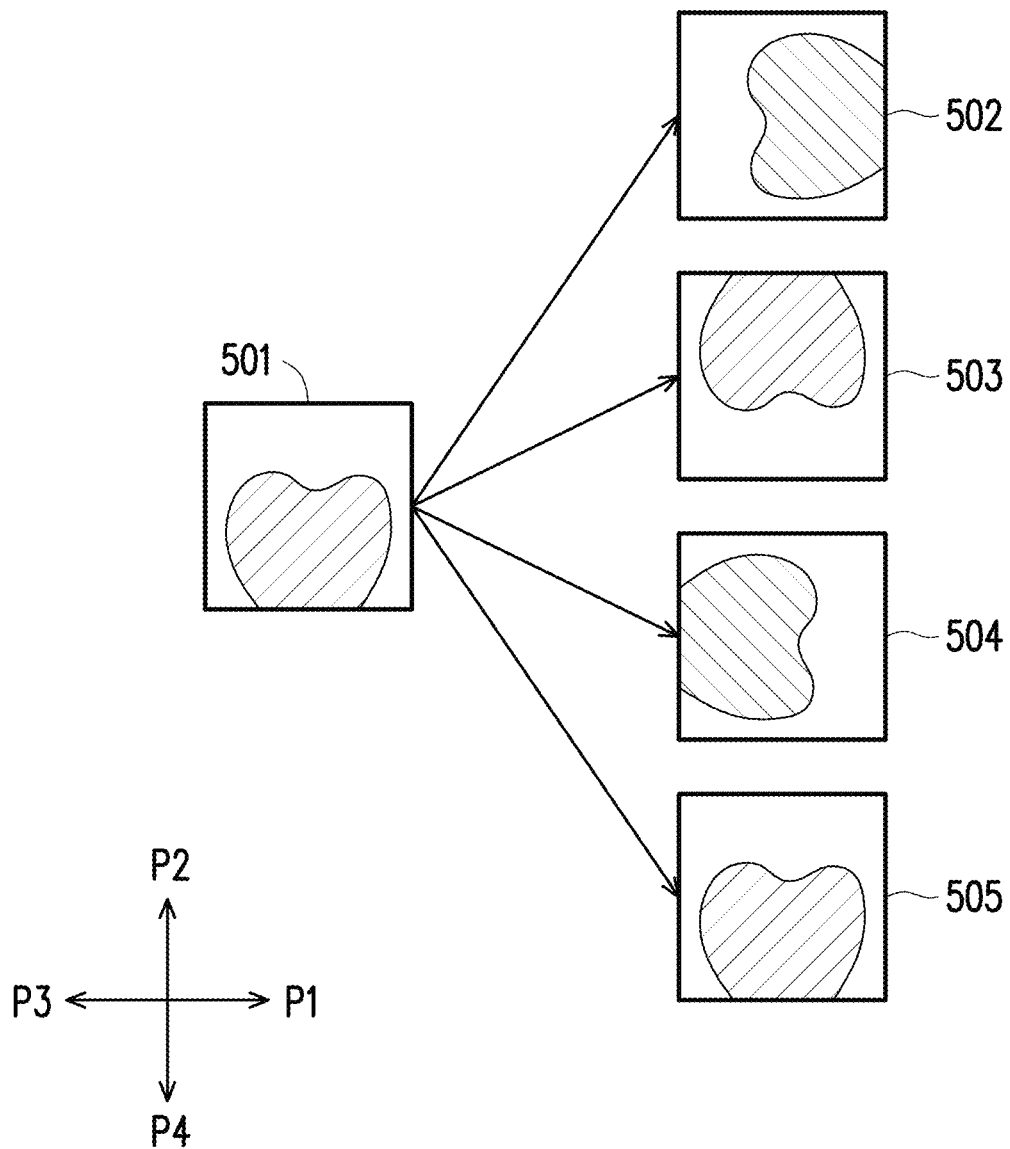
FIG. 5 is a schematic diagram of pressure pattern comparison according to the embodiment of FIG. 4.

FIG. 4 is a block view of an orientation device according to another embodiment of the invention. With reference to FIG. 4, an orientation device 400 includes a pressure sensor 410, a computing unit 420, an internal direction control unit 440, and a database 440. The computing unit 420 is coupled to the pressure sensor 410, the internal direction control unit 430, and the database 440. In this embodiment, the orientation device 400 further includes the database 440. The database 440 is configured to store a plurality of reference patterns in advance. In this embodiment, the computing unit 420 integrates a plurality of pressure data sensed by the pressure sensor 410 to a draw a pressure pattern. The computing unit 420 reads the reference patterns in the database 440 and compares the pressure pattern with the reference patterns, so as to determine whether the pressure pattern matches one of the reference patterns to obtain a front direction data. The following FIG. 5 is taken as an example to explain how to compare the pressure pattern with the reference patterns. In addition, in this embodiment, people having ordinary skill in the art may acquire sufficient teachings, suggestions, and implementation illustration related to the details of the technology content of the pressure sensor 410, the computing unit 420, and the internal direction control unit 430 according to description of the embodiments of FIG. 1, and that detailed descriptions are not further provided hereinafter.

FIG. 5 is a schematic diagram of pressure pattern comparison according to the embodiment of FIG. 4 of the invention. With reference to FIG. 4 and FIG. 5, the computing unit 420 integrates the pressure data sensed by the pressure sensor 410 and draws a pressure pattern 501 as shown in FIG. 5. The database 440 stores, for example, fourth reference patterns 502 to 505. The four reference patterns 502 to 505 may sequentially presents a front direction P1, a direction P2, a direction P3, and a direction P4. In this embodiment, the computing unit 420 compares the pressure pattern 501 with the four reference patterns 502 to 505. As shown in FIG. 5, the pressure pattern 501 matches the reference pattern 505. Hence, the computing unit 420 defines a front direction of the orientation device 400 is the direction P4.

Nevertheless, the computing unit 420 is not limited to determine the front direction of the orientation device 400 through the foregoing determination method. In an embodiment, the computing unit 420 may also directly analyze a pressure distribution situation of the pressure pattern 501, so as to define the front direction of the orientation device 400. To be specific, the computing unit 420 directly determines whether pressure values of four pattern edges of the pressure pattern 501 change. As shown in FIG. 5, in the direction P4, the pressure value of one side of the pressure pattern 501 changes, while pressure values of the other sides do not change. Hence, the computing unit 120 determines the front direction of the orientation device 400 is the direction P4.

Figure 6:
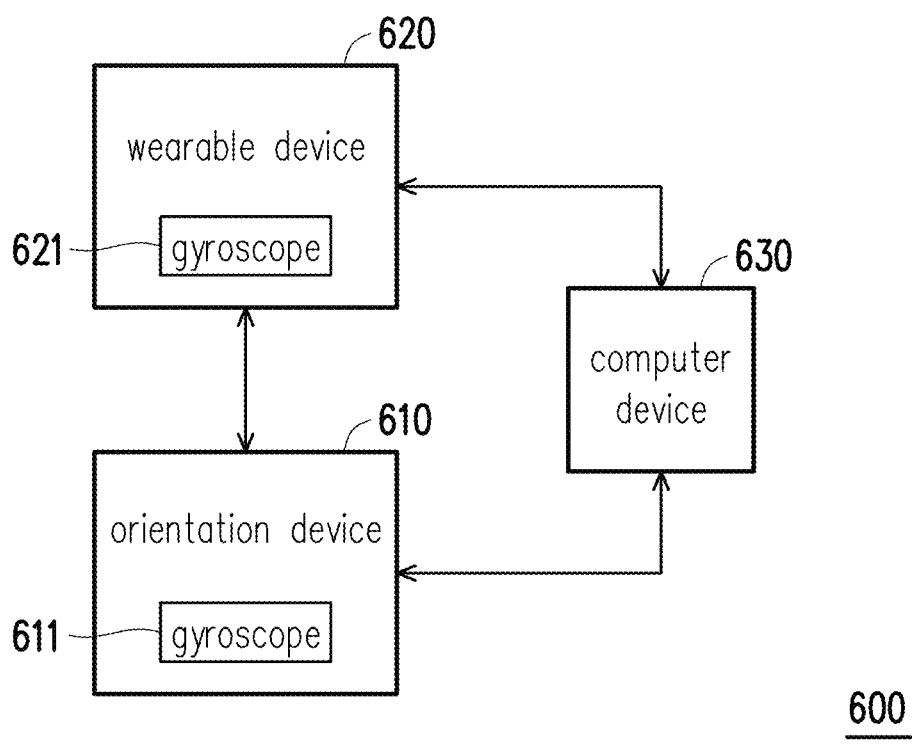
FIG. 6 is a block diagram of an orientation system according to an embodiment of the invention.

FIG. 6 is a block diagram of an orientation system according to an embodiment of the invention. With reference to FIG. 6, an orientation system 600 includes an orientation device 610, a wearable device 620, and a computer device 630. The orientation device 610 is coupled to the wearable device 620 and the computer device 630, and the wearable device 620 is coupled to the computer device 630. The orientation device 610, the wearable device 620, and the computer device 630 communicates with one another through a wired or wireless method. In this embodiment, the orientation device 610 is, for example, the orientation device 100 or the orientation device 400 as described in the embodiment of FIG. 1 or FIG. 4. The orientation device 610 provides the front direction data and the direction control definition data to at least one of the wearable device 620 and the computer device 630. In this embodiment, the wearable device 620 is, for example, a virtual reality head-mounted display (VR HMD).

In addition, in an embodiment, the computer device 630 is further coupled to a monitoring device, wherein the monitoring device is configured to monitor a virtual world content displayed by the wearable device 620, so as to assist the user in performing manipulation. The monitoring device provides another front direction data and another direction control definition data to replace or revise the front direction data and the direction control definition data provided by the orientation device 610 according to the virtual world content displayed by the wearable device 620.

In this embodiment, the orientation device 610 provides the front direction data and the direction control definition data to the wearable device 620, as such, a virtual world direction of a virtual reality image executed by the wearable device 620 may be synchronized with a direction the user is facing. Alternatively, the orientation device 610 provides the front direction data and the direction control definition data to the computer device 630, as such, an application executed by the computer device 630 obtains a data of the direction the user is facing. In addition, in an embodiment, the orientation device 610 further outputs a direction control signal to the wearable device 620 and the computer device 630, so as to allow the user to perform a corresponding control operation in a virtual world through the orientation device 610.

In this embodiment, the orientation device 610 further includes a gyroscope 611, wherein the gyroscope 611 is configured to sense a first angle data of the orientation device 610. The first angle data refers to an included angle between the front direction of the orientation device 610 and a north direction (geomagnetic north). A computing unit of the orientation device 610 further defines a direction data according to the first angle data. That is, the orientation device 610 determines a sitting direction of the user through a pressure sensor first, so as to determine a direction one side of the orientation device 610 is facing is the front direction. The orientation device 610 then further determines the included angle between the front direction and the north direction through the gyroscope 611. Hence, the orientation device 610 may obtain more specific direction information. In addition, in an embodiment, the gyroscope 611 further provides information on output direction changes, so as to allow the computing unit of the orientation device 610 to generate a control signal to the wearable device 620 and the computer device 630 according to the information on direction changes provided by the gyroscope 611. In this way, the user may perform the corresponding control operation in the virtual world through the orientation device 610.

In addition, in an embodiment, the orientation device 610 may further include a triggering unit (not shown). The triggering unit is coupled to a first gyroscope 611. The triggering unit is configured to output a triggering signal to the first gyroscope 611 to enable the first gyroscope 611 when an object is disposed on a bearing surface of the orientation device 610. That is, the orientation device 610 may selectively enable the first gyroscope 611 through the triggering unit, so as to effectively save energy consumption.

In this embodiment, the wearable device 620 further includes a gyroscope 621. Moreover, the wearable device 620 is, for example, a head-mounted device, wherein the gyroscope 621 is configured to sense a second angle data of a facing direction of the user. The wearable device 620 provides the second angle data obtained by the gyroscope 621 to the computing unit of the orientation device 610 through a wired or wireless transmission method. The second angle data refers to an included angle between the facing direction of the user and the north direction (geomagnetic north). The computing unit of the orientation device 610 further defines the direction data according to the second angle data. That is, the orientation device 610 determines the sitting direction of the user through the pressure sensor first, so as to determine the direction one side of the orientation device 610 is facing is the front direction. The orientation device 610 then further determines the included angle between the front direction and the north direction through the gyroscope 611. Moreover, the orientation device 610 further determines an included angle between a facing direction of the user's head and the north direction through the gyroscope 621. In this way, the front direction of the orientation device 610 and the facing direction of the user's head are identical.

Figure 7A:
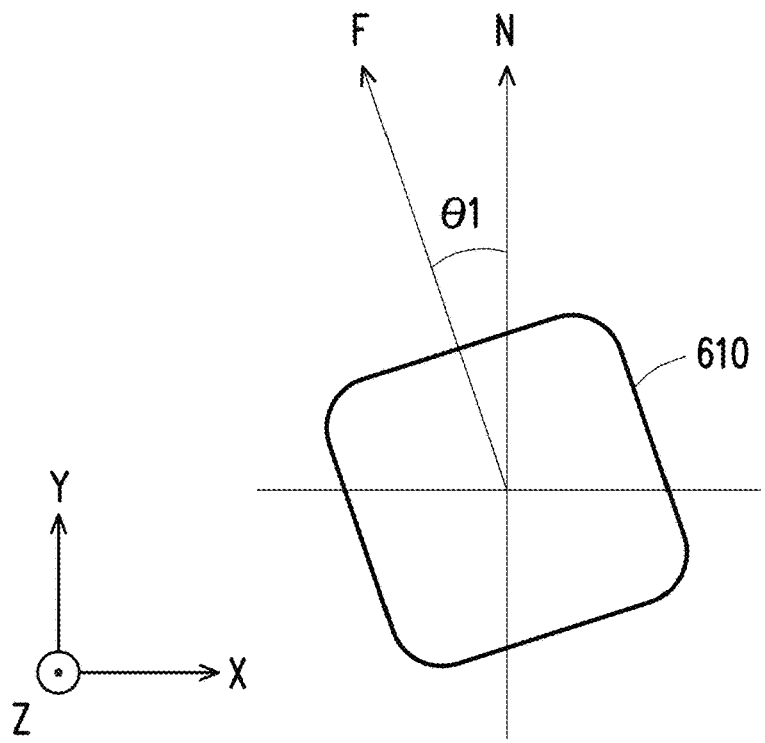
FIG. 7A is a schematic diagram of obtaining a first direction data according to the embodiment of FIG. 6.

FIG. 7A is a schematic diagram of obtaining a first direction data according to the embodiment of FIG. 6. With reference to FIG. 6 and FIG. 7A, when the user sits on the orientation device 610, the orientation device 610 determines the sitting direction of the user first through the pressure sensor to define a front direction F. At this time, the computing unit of the orientation device 610 only knows the direction one side of the orientation device 610 is facing is the front direction F but does not know a relationship between the front direction F and the geomagnetic north. Hence, the orientation device 610 further determines an angle θ1 between the front direction F and a north direction N through the gyroscope 611. In this embodiment, the computing unit of the orientation device 610 regards the angle θ1 as the first angle data. Moreover, the computing unit further defines the front direction data according to the first angle data. Accordingly, the wearable device 620 and the computer device 630 learn the angle between the front direction F of the orientation device 610 and the north direction N through the front direction data.

Figure 7B:
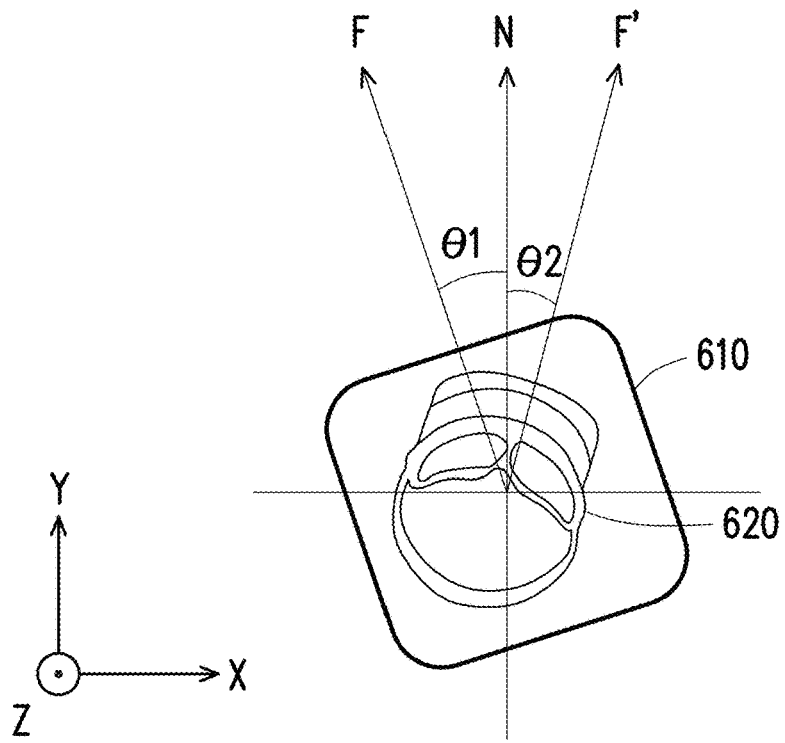
FIG. 7B is a schematic diagram of obtaining a second direction data according to the embodiment of FIG. 6.

FIG. 7B is a schematic diagram of obtaining a second direction data according to the embodiment of FIG. 6. With reference to FIG. 6 to FIG. 7B, after the orientation device 610 specifically defines the relationship between the front direction F and the north direction N through the gyroscope 611, the orientation device 610 further determines an angle θ2 between a facing direction F' of the user's head and the north direction N through the gyroscope 621. In this embodiment, the computing unit of the orientation device 610 regards the angle θ2 as the second angle data and further defines the front direction data according to the second angle data. Accordingly, the wearable device 620 and the computer device 630 adjust the front direction F of the orientation device 610 to be identical with the facing direction F' of the user's head through the front direction data.

In other words, since under certain circumstances, the facing direction of the user's head and the sitting direction of the user's body may be different, for instance, the user turns his/her head with the body fixed, the orientation device 610 further adjusts the front direction F according to the second angle data provided by the wearable device 620. Hence, when the computer device 630, for example, executes a virtual reality program, the computer device 630 correspondingly sets a virtual reality image content and performs an interactive function according to the orientation device 610, the wearable device 620, and the jointly-decided front direction data. The computer device may be a tablet computer, a notebook computer, or a mobile phone.

Figure 8:
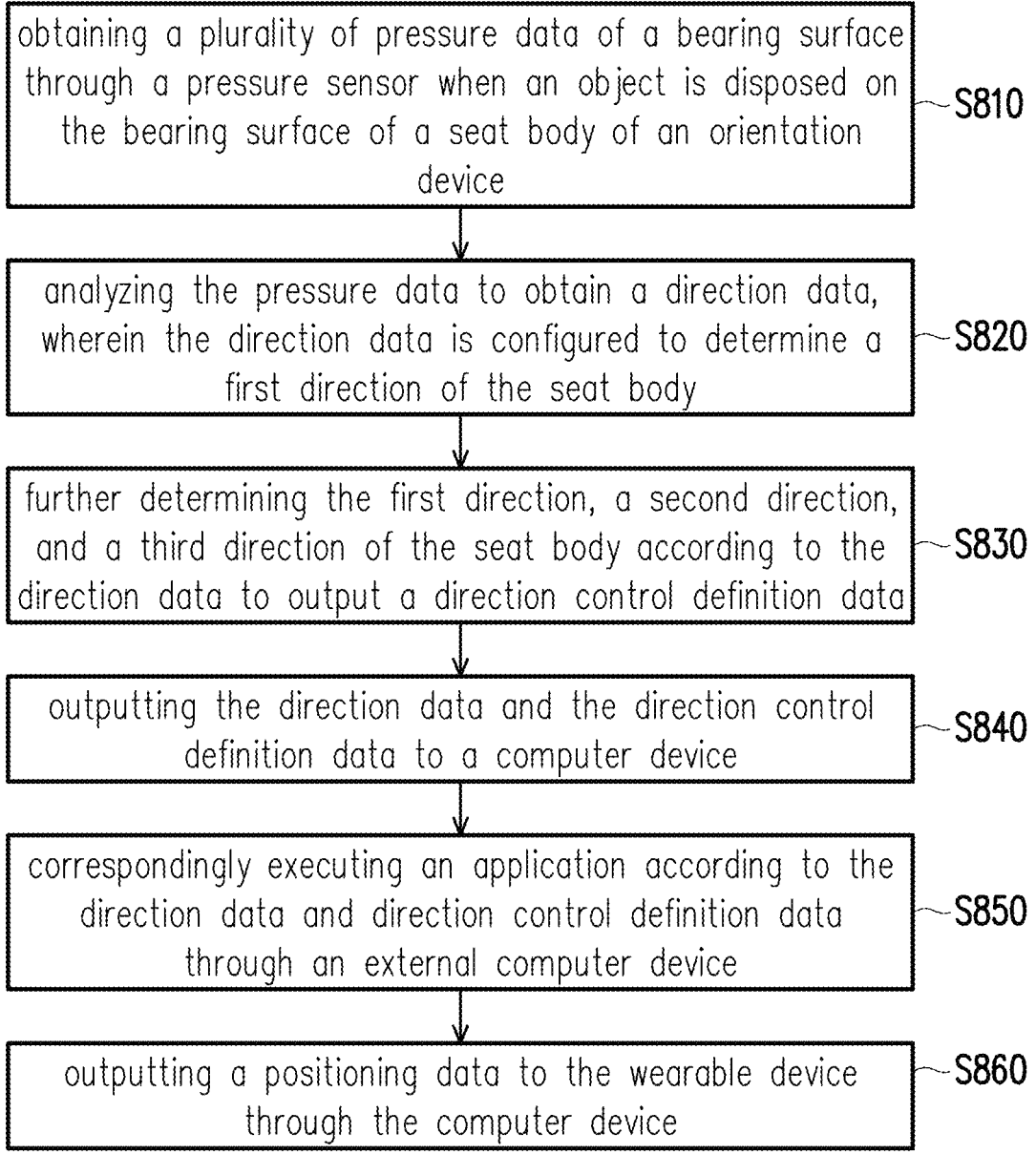
FIG. 8 is a flowchart of an orientation method according to an embodiment of the invention.

FIG. 8 is a flowchart of an orientation method according to an embodiment of the invention. The orientation method of this invention may be applicable to the orientation device and the orientation system of FIG. 1, FIG. 4, or FIG. 6. With reference to FIG. 6 and FIG. 8, an orientation system 600 of FIG. 6 is taken as an example. In step S810, when an object is disposed on a bearing surface of a seat body of the orientation device 610, the orientation device 610 obtains a plurality of pressure data of the bearing surface through the pressure sensor. In step S820, the orientation device 610 analyzes the pressure data to obtain a direction data, wherein the direction data is configured to determine a first direction of the seat body. In step S830, the orientation device 610 further determines a second direction, a third direction, and a fourth direction of the seat body according to the direction data to generate a direction control definition data. In step S840, the orientation device 610 outputs the direction data and the direction control definition data to the computer device 630 (or the wearable device 620). In step S850, the computer device 630 correspondingly executes an application according to the direction data and direction control definition data. In step S860, the computer device 630 outputs a positioning data to the wearable device 620, wherein the positioning data may include the direction data and the direction control definition data. In this embodiment, the direction data may be the front direction data. The first direction may be the front direction. The second direction may be the back direction. The third direction may be the left direction. The fourth direction may be the right direction. That is, the orientation device 610 of this invention may effectively define the front direction according to the sitting direction of the user and provides the direction control definition data to the computer device 630 (or the wearable device 620). In this way, when executing a specific application, the computer device may provide the corresponding interactive function according to the front direction data.

In view of the foregoing, the orientation device, the orientation method, and the orientation system of the invention may provide the non-directional seat body to bear the user and automatically determine the front direction of the seat body according to the sitting direction or the sitting posture of the user sitting on the seat body. To be more specific, the orientation device of this invention may sense the pressure data generated when the user sits on the seat body through the pressure sensor, and obtain the direction the user is facing when the user sits on the seat body through analyzing the pressure data to obtain the front direction data. Further, the orientation device of this invention not only automatically determines the front direction of the seat body but also provides the corresponding front direction data to the computer device or the wearable device. Therefore, the computer device or the wearable device may be combined with the orientation device to provide the corresponding interactive function.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An orientation device, comprising:
a seat body, comprising a bearing surface, the seat body being non-directional;
a pressure sensor, disposed below the bearing surface and configured to obtain a plurality of pressure data when an object is disposed on the bearing surface; and
a computing unit, coupled to the pressure sensor and configured to analyze the pressure data to obtain a direction data, wherein the direction data is configured to determine a first direction of the seat body,
wherein the computing unit calculates four pressure average values of the pressure data in four quadrants of a pressure distribution and compares the four pressure average values,
wherein the computing unit determines a second direction corresponding to the highest two values among the four pressure average values to determine the second direction is the back, a direction opposite to the second direction is the first direction, and the first direction is defined as the front.

2. The orientation device as claimed in claim 1, wherein the direction data is a front direction data, and the first direction is a front direction.

3. The orientation device as claimed in claim 1, wherein the orientation device further comprises:
an internal directioncontrol unit, coupled to the computing unit,
wherein the internal direction control unit further determines the second direction, a third direction, and a fourth direction of the seat body according to the direction data to output a direction control definition data.

4. The orientation device as claimed in claim 3, wherein the second direction is a back direction, the third direction is a left direction, and the fourth direction is a right direction.

5. The orientation device as claimed in claim 3, wherein the internal direction control unit provides the direction data and the direction control definition data to a computer device such that the computer device correspondingly executes an application according to the direction data and the direction control definition data.

6. The orientation device as claimed in claim 1, wherein the orientation device further comprises:
a database, coupled to the computing unit and configured to store a plurality of reference patterns,
wherein the computing unit integrates the pressure data to obtain a pressure pattern and determines whether the pressure pattern matches one of the reference patterns to obtain the direction data.

7. The orientation device as claimed in claim 1, wherein the orientation device further comprises:
a first gyroscope, coupled to the computing unit, configured to obtain a first angle data, and providing the first angle data to the computing unit,
wherein the computing unit adjusts the direction data according to the first angle data to further define a first angle between the first direction and a north direction.

8. The orientation device as claimed in claim 7, wherein the orientation device further comprises:
a triggering unit, coupled to the first gyroscope and configured to output a triggering signal to the first gyroscope to enable the first gyroscope when the object is disposed on the bearing surface.

9. The orientation device as claimed in claim 1, wherein the orientation device is coupled to a wearable device, and the wearable device is configured to be worn on the object, wherein the wearable device comprises:
a second gyroscope, coupled to the computing unit and configured to obtain a second angle data,
wherein the computing unit adjusts the direction data according to the second angle data to further define a second angle between a facing direction of the object and a north direction and adjust the first direction through the second angle.

10. An orientation method, suited for an orientation device, the orientation method comprising:
obtaining a plurality of pressure data of a bearing surface through a pressure sensor when an object is disposed on the bearing surface of a seat body of the orientation device; and
analyzing the pressure data through a computing unit to obtain a direction data, wherein the direction data is configured to determine a first direction of the seat body, wherein the step of analyzing the pressure data through the computing unit to obtain the front direction data comprises:
calculating four pressure average values of the pressure data in four quadrants of a pressure distribution and comparing the four pressure average values through the computing unit; and
determining a second direction corresponding to the lowest two values among the four pressure average values to determine the second direction is the back through the computing unit, wherein a direction opposite to the second direction is the first direction, and the first direction is defined as the front.

11. The orientation method as claimed in claim 10, wherein the direction data is a front direction data, and the first direction is a front direction.

12. The orientation method as claimed in claim 10, further comprising:
further determining the second direction, a third direction, and a fourth direction of the seat body according to the direction data through an internal direction control unit to output a direction control definition data.

13. The orientation method as claimed in claim 12, wherein the second direction is a back direction, the third direction is a left direction, and the fourth direction is a right direction.

14. The orientation method as claimed in claim 12, wherein the internal direction control unit provides the direction data and the direction control definition data to a computer device such that the computer device correspondingly executes an application according to the direction data and the direction control definition data.

15. The orientation method as claimed in claim 10, wherein the step of analyzing the pressure data through the computing unit to obtain the direction data comprises:
storing a plurality of reference patterns in advance through a database; and
integrating the pressure data to obtain a pressure pattern and determining whether the pressure pattern matches one of the reference patterns to obtain the direction data through the computing unit.

16. The orientation method as claimed in claim 10, further comprising:
obtaining a first angle data through a first gyroscope; and
adjusting the direction data according to the first angle data to further determine a first angle between the first direction and a north direction through the computing unit.

17. The orientation method as claimed in claim 16, further comprising:
outputting a triggering signal to the first gyroscope through a triggering unit to enable the first gyroscope when the object is disposed on the bearing surface.

18. The orientation method as claimed in claim 10, further comprising:
coupling the orientation device to a wearable device, wherein the wearable device is configured to be worn on the object;
obtaining a second angle data through a second gyroscope of the wearable device; and
adjusting the direction data according to the second angle data to further determine a second angle between a facing direction of the object and a north direction and adjust the first direction through the second angle through the computing unit.

19. An orientation system, comprising:
an orientation device, comprising:

a seat body, having a bearing surface, the seat body being non-directional;

a pressure sensor, disposed below the bearing surface and configured to obtain a plurality of pressure data when an object is disposed on the bearing surface; and a computing unit, coupled to the pressure sensor and configured to analyze the pressure data to obtain a direction data, wherein the direction data is configured to determine a first direction of the seat body; and a computer device, coupled to the orientation device and configured to receive the direction data to correspondingly execute an application according to the direction data, wherein the computing unit calculates four pressure average values of the pressure data in four quadrants of a pressure distribution and compares the four pressure average values, wherein the computing unit determines a second direction corresponding to the highest two values among the four pressure average values to determine the second direction is the back, a direction opposite to the second direction is the first direction, and the first direction is defined as the front.

20. The orientation system as claimed in claim 19, wherein the direction data is a front direction data, and the first direction is a front direction.

21. The orientation system as claimed in claim 19, wherein the orientation device further comprises:

a database, coupled to the computing unit and configured to store a plurality of reference patterns, wherein the computing unit integrates the pressure data to obtain a pressure pattern and determines whether the pressure pattern matches one of the reference patterns to obtain the direction data.

22. The orientation system as claimed in claim 19, wherein the orientation device further comprises:

a first gyroscope, coupled to the computing unit and configured to provide a first angle data to the computing unit, wherein the computing unit adjusts the direction data through the first angle data to further define a first angle between the first direction and a north direction.

23. The orientation system as claimed in claim 19, further comprising:

a wearable device, coupled to the orientation device, the wearable device being configured to be worn on the object, wherein the wearable device comprises:

a second gyroscope, the second gyroscope being coupled to the computing unit, the second gyroscope being configured to provide a second angle data to the computing unit, wherein the computing unit adjusts the direction data through the second angle data to further determine a second angle between a facing direction of the object and a north direction and adjust the first direction through the second angle.

* * * * *